(12) United States Patent
Zhao et al.

(10) Patent No.: US 10,720,111 B2
(45) Date of Patent: Jul. 21, 2020

(54) DISPLAY SCREEN BACKLIGHT CONTROL METHOD AND APPARATUS, AND TERMINAL

(71) Applicant: Huawei Technologies Co., Ltd., Shenzhen (CN)

(72) Inventors: Fanfan Zhao, Beijing (CN); Jing Zhao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 74 days.

(21) Appl. No.: 16/067,006

(22) PCT Filed: Dec. 31, 2015

(86) PCT No.: PCT/CN2015/100184
§ 371 (c)(1),
(2) Date: Oct. 4, 2018

(87) PCT Pub. No.: WO2017/113326
PCT Pub. Date: Jul. 6, 2017

(65) Prior Publication Data
US 2019/0206336 A1  Jul. 4, 2019

(51) Int. Cl.
*G09G 3/34* (2006.01)
*G09G 3/36* (2006.01)
(Continued)

(52) U.S. Cl.
CPC ......... *G09G 3/3406* (2013.01); *G06F 1/3265* (2013.01); *G06F 3/041* (2013.01);
(Continued)

(58) Field of Classification Search
CPC ............ G09G 3/3406; G09G 3/36; G09G 2320/0233; G09G 2320/062;
(Continued)

(56) References Cited

U.S. PATENT DOCUMENTS 8,593,427 B1   11/2013  Yang et al.
2010/0164857 A1   7/2010  Liu et al.
(Continued)

FOREIGN PATENT DOCUMENTS

CN   101256746 A   9/2008
CN   101414695 A   4/2009
(Continued)

OTHER PUBLICATIONS

Ang, T.,"Fundamentals of Photography the Essential Handbook for Both Digital and Film Cameras," dated Jun. 2011, 7 pp.

*Primary Examiner* — Robert J Michaud
(74) *Attorney, Agent, or Firm* — Slater Matsil, LLP

(57) ABSTRACT

This application provides a display screen backlight control method, a display screen backlight control apparatus, and a terminal. The method includes determining a backlight to-be-switched-on region of a display screen according to an operation on the display screen, determining a specified to-be-lighted light source according to the backlight to-be-switched-on region, and lighting the specified to-be-lighted light source and illuminating at least the backlight to-be-switched on region of the display screen while maintaining other light sources associated with region outside of the backlight to-be-switched-on region in an unilluminated state.

20 Claims, 2 Drawing Sheets

(51) Int. Cl.
*G06F 1/3234* (2019.01)
*G06F 3/041* (2006.01)
(52) U.S. Cl.
CPC ....... *G09G 3/36* (2013.01); *G09G 2320/0233* (2013.01); *G09G 2320/062* (2013.01); *G09G 2320/0626* (2013.01); *G09G 2320/08* (2013.01); *G09G 2330/021* (2013.01)
(58) Field of Classification Search
CPC ....... G09G 2320/0626; G09G 2320/08; G09G 2330/062; G09G 2330/021; G06F 1/3265; G06F 3/041
See application file for complete search history.

(56) References Cited

U.S. PATENT DOCUMENTS

| | | |
|---|---|---|
| 2010/0231610 A1 | 9/2010 | Hoffman et al. |
| 2012/0293477 A1 | 11/2012 | Ni |
| 2013/0309650 A1 | 11/2013 | Carney |
| 2014/0298276 A1 | 10/2014 | Yokoyama et al. |
| 2016/0117993 A1* | 4/2016 | Buckley ............... G09G 3/3426 345/694 |
| 2017/0017342 A1* | 1/2017 | Wu ......................... G06F 3/041 |

FOREIGN PATENT DOCUMENTS

| | | |
|---|---|---|
| CN | 101465107 A | 6/2009 |
| CN | 101645255 A | 2/2010 |
| CN | 102087818 A | 6/2011 |
| CN | 102087836 A | 6/2011 |
| CN | 201918146 U | 8/2011 |
| CN | 102681648 A | 9/2012 |
| CN | 102789303 A | 11/2012 |
| CN | 202998219 U | 6/2013 |
| CN | 103345906 A | 10/2013 |
| CN | 103533617 A | 1/2014 |
| CN | 103747134 A | 4/2014 |
| CN | 104601761 A | 5/2015 |

* cited by examiner

DISPLAY SCREEN BACKLIGHT CONTROL METHOD AND APPARATUS, AND TERMINAL

CROSS-REFERENCE TO RELATED APPLICATIONS

This patent application is a national phase filing under section 371 of PCT/CN2015/100184 filed Dec. 31, 2015, which is incorporated herein by reference in its entirety.

TECHNICAL FIELD

This application relates to the terminal field, and in particular, to a display screen backlight control method and apparatus, and a terminal.

BACKGROUND

A Liquid-Crystal Display (LCD) display screen is a display device that displays an image by controlling a rotation direction of liquid crystal molecules by means of changing a voltage. The LCD display screen has advantages of low power consumption, long service time, and the like. Therefore, in the prior art, the LCD display screen has become more widely used as a display apparatus of a terminal, such as a mobile phone or a tablet computer.

A core of the LCD display screen is an LCD optical module. The LCD optical module includes an upper-layer glass substrate, a lower-layer glass substrate, and a liquid crystal cell that is disposed between the two layers of glass substrates. A thin film transistor is disposed on the lower-layer glass substrate, and a color filter is disposed on the upper-layer glass substrate. By changing a signal and a voltage of the thin film transistor, a rotation direction of liquid crystal molecules in the liquid crystal cell may be controlled, and light incident from the lower-layer glass substrate may be controlled to emit from the upper-layer glass substrate, so that an image is displayed.

The LCD optical module itself does not emit light. Therefore, to implement that light emits from the upper-layer glass substrate of the LCD display screen, a light source is used to provide backlight for the LCD display screen, so that light emitted from the light source is incident from the lower-layer glass substrate of the LCD display screen. An Light Emitting Diode (LED) has advantages of a small size, low power consumption, and the like. Therefore, in the prior art, the LED is usually used to provide backlight for the LCD optical module. The LED is a point light source. Therefore, to ensure uniform luminance of backlight provided by the LED, a light guide plate is further required to diffuse light emitted from the LED, so that the LED is transformed from a point light source to an area light source, and the area light source is used to provide backlight for the LCD optical module.

With continuous progress of technologies, an area of an LCD display screen keeps increasing, and correspondingly, an area of an LCD optical module also keeps increasing. Because an area of an area light source transformed from an LED point light source is limited, with a continuous increase in the area of the LCD display screen, there is an increasing quantity of LEDs, used to provide backlight for the LCD optical module, in the LCD display screen. However, an increase in a quantity of LEDs leads to an increase in power consumption of the LCD display screen.

SUMMARY

Embodiments of this application provide a display screen backlight control method and apparatus, and a terminal, so as to reduce power consumption of a display screen.

According to a first aspect, an embodiment of this application provides a display screen backlight control method, where the method includes determining, by a terminal, a backlight to-be-switched-on region of a display screen, determining a specified to-be-lighted light source according to the backlight to-be-switched-on region, and lighting the specified light source. According to this implementation, the terminal may light only some light sources of the display screen, so that light source power consumption can be reduced. Therefore, power consumption of the display screen can be decreased.

With reference to the first aspect, in a first possible implementation of the first aspect, the terminal may determine the backlight to-be-switched-on region according to a contact status between the display screen and an object. When determining the backlight to-be-switched-on region according to the contact status between the display screen and the object, the terminal may first determine a contact region in which the display screen is in contact with the object, and when a ratio of an area of the contact region to an area of the display screen is greater than or equal to a threshold, use a region of the display screen except the contact region as the backlight to-be-switched-on region, or the terminal may first determine a contact region in which the display screen is in contact with the object, and when the contact region does not change within first duration, use a region of the display screen except the contact region as the backlight to-be-switched-on region. According to this implementation, the terminal can determine the backlight to-be-switched-on region according to the contact status between the display screen and the object, so that different backlight to-be-switched-on regions can be determined according to different requirements.

With reference to the first aspect, in a second possible implementation of the first aspect, the terminal may alternatively determine the backlight to-be-switched-on region according to a user interface image. For example, when the display screen is configured to display a specified user interface, the terminal may use a region of a specified user interface element on the specified user interface displayed on the display screen, as the backlight to-be-switched-on region. According to this implementation, the terminal can determine different backlight to-be-switched-on regions according to different requirements.

With reference to any one of the first aspect or the first and the second possible implementations of the first aspect, in a third possible implementation of the first aspect, the terminal may further correct, according to the specified light source, chrominance of an image displayed in the backlight switched-on region. The terminal corrects, according to the specified light source, the chrominance of the image displayed in the backlight switched-on region. This can ensure that the image displayed in the backlight switched-on region has uniform luminance.

According to a second aspect, this application further provides a liquid crystal display screen backlight control apparatus, where the apparatus includes units configured to perform steps included in various implementations of the first aspect.

According to a third aspect, this application further provides a terminal, where the terminal includes a processor, a display screen, and a memory. The processor may execute a program or an instruction stored in the memory, so as to control display screen backlight by using the method in various implementations of the first aspect.

According to a fourth aspect, this application further provides a storage medium, where the computer storage medium may store a program, and when the program is executed, some or all steps in each embodiment of a data transmission method provided in the present invention may be included.

According to the method, the apparatus, and the terminal that are provided in the embodiments of this application, when the display screen needs to display an image to a user, only some light sources of the display screen may be lighted, so that light source power consumption can be reduced. Therefore, power consumption of the display screen can be decreased.

BRIEF DESCRIPTION OF THE DRAWINGS

To describe the technical solutions in the embodiments of the present invention more clearly, the following briefly describes the accompanying drawings required for describing the embodiments. Apparently, a person of ordinary skill in the art may still derive other drawings from these accompanying drawings without creative efforts.

DETAILED DESCRIPTION OF ILLUSTRATIVE EMBODIMENTS

Figure 1:
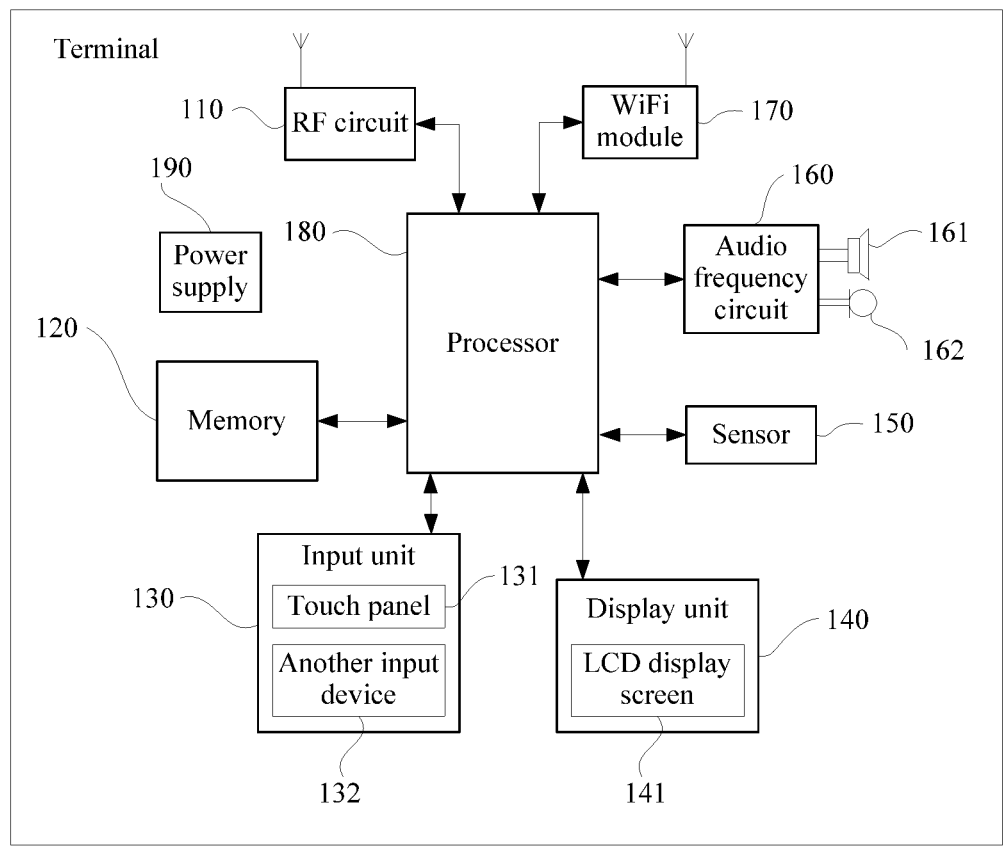
FIG. 1 is a schematic structural diagram of an embodiment of a terminal according to the present invention.

Referring to FIG. 1, FIG. 1 is a schematic structural diagram of an embodiment of a terminal according to this application.

The terminal may be a mobile phone, a tablet computer, a personal digital assistant (PDA), a point of sale (POS), an in-vehicle computer, and the like.

As shown in FIG. 1, the terminal may include components such as a radio frequency (RF) circuit 110, a memory 130, an input unit 130, a display unit 140, a sensor 150, an audio frequency circuit 160, a Wireless Fidelity (WiFi) module 170, a processor 180, and a power supply 190. A person skilled in the art can understand that a mobile phone structure shown in FIG. 1 does not constitute a limitation on the mobile phone, and the mobile phone may include more or fewer components than those shown in the figure, or a combination of some components, or the components disposed differently.

The following describes each constituent component of the terminal in detail with reference to FIG. 1.

The RF circuit 110 may be configured to: send and receive information, or send and receive a signal during a call, and in particular, after receiving downlink information of a base station, send the downlink information to the processor 180 for processing, and send related uplink data to the base station. Generally, the RF circuit includes but is not limited to an antenna, at least one amplifier, a transceiver, a coupler, a low noise amplifier (LNA), a duplexer, and the like. In addition, the RF circuit 110 may also communicate with a network and another device by means of wireless communications. Any communications standard or protocol may be used for the wireless communications, including but not limited to the Global System for Mobile Communications (GSM), general packet radio service (GPRS), Code Division Multiple Access (CDMA), Wideband Code Division Multiple Access (WCDMA), Long Term Evolution (LTE), an e-mail, a short message service (SMS), and the like.

The memory 130 may be configured to store a software program and a module. The processor 180 executes various functions and applications of the terminal and data processing by running the software program and the module stored in the memory 130. The memory 130 may mainly include a program storage area and a data storage area. The program storage area may store an operating system, an application program required for at least one function (for example, an audio playback function and an image playback function), and the like. The data storage area may store data (for example, audio data and a phone book) created according to use of the terminal, and the like. In addition, the memory 130 may include a high-speed random access memory, and may further include a non-volatile memory, for example, at least one disk storage device, a flash memory device, or another volatile solid-state storage device.

The input unit 130 may be configured to receive input digital or character information, and generate key signal input related to user setting and function control of the terminal. Specifically, the input unit 130 may include a touch panel 131 and another input device 132. The touch panel 131, also referred to as a touchscreen, may collect a touch operation performed by a user on or near the touch panel 131 (for example, an operation performed on or near the touch panel 131 by the user by using a finger, a stylus, or any other suitable object or accessory), and drive a corresponding connection apparatus according to a preset program. Optionally, the touch panel 131 may include two parts, including a touch detection apparatus and a touch controller. The touch detection apparatus detects a touch orientation of the user, detects a signal brought by a touch operation, and transmits the signal to the touch controller. The touch controller receives touch information from the touch detection apparatus, converts the touch information into contact coordinates, and then sends the contact coordinates to the processor 180, and can receive and execute a command sent by the processor 180. In addition, the touch panel 131 may be implemented by using multiple types, such as a resistive type, a capacitive type, an infrared type, and a surface acoustic wave type. In addition to the touch panel 131, the input unit 130 may include the another input device 132. Specifically, the another input device 132 may include but is not limited to one or more of a physical keyboard, a function key (for example, a volume control key or an on/off key), a trackball, a mouse, a joystick, or the like.

The display unit 140 may be configured to display information entered by the user, or information provided for the user, and various menus of the terminal. The display unit 140 may include a display screen 141. Further, the touch panel 131 may cover the display screen 141. After detecting a touch operation on or near the touch panel 131, the touch panel 131 transmits information about the touch operation to the processor 180 to determine a touch event type, and then the processor 180 provides a corresponding visual output on the display screen 141 according to the touch event type. In FIG. 1, the touch panel 131 and the display screen 141 are used as two independent components to implement input and input functions of the terminal. However, in some embodiments, the touch panel 131 and the display screen 141 may be integrated to implement the input and output functions of the terminal.

The terminal may further include at least one sensor 150, such as a light sensor, a motion sensor, and another sensor. Specifically, the light sensor may include an ambient light sensor and a proximity sensor. The ambient light sensor may adjust luminance of the display screen 141 according to brightness of ambient light. The proximity sensor may turn off the display screen 141 and/or backlight when the terminal moves close to an ear. As a type of motion sensor, an accelerometer sensor may detect accelerations in all directions (three axes in general), may detect, in a stationary state, a value and a direction of gravity, and may be applied to a mobile phone posture recognition application (for example, screen switching between a landscape orientation and a portrait orientation, related games, and magnetometer posture calibration), a vibration recognition related function (for example, a pedometer or tapping), and the like. Other sensors that can be configured on the terminal such as a gyroscope, a barometer, a hygrometer, a thermometer, and an infrared sensor are not described herein.

The audio frequency circuit 160, a loudspeaker 161, and a microphone 162 may provide an audio interface between the user and the terminal. The audio frequency circuit 160 may transmit, to the loudspeaker 161, an electrical signal that is obtained by converting received audio data, and the loudspeaker 161 converts the electrical signal into a sound signal and outputs the sound signal. In addition, the microphone 162 converts a collected sound signal into an electrical signal, the audio frequency circuit 160 receives and converts the electrical signal into audio data, and outputs the audio data to the RF circuit 108, to send the audio data to, for example, another mobile phone, or outputs the audio data to the memory 130 for further processing.

WiFi belongs to a short-distance wireless transmission technology. By using the WiFi module 170, the terminal may help the user to send or receive an email, browse a web page, access streaming media, and the like. The WiFi module 170 provides wireless broadband Internet access for the user. Although the WiFi module 170 is shown in FIG. 1, it can be understood that the WiFi module 170 is not a mandatory constituent of the terminal and may be totally omitted according to a requirement without changing the essence scope of the present invention.

The processor 180, a control center of the terminal, is connected to all parts of the entire mobile phone by using various interfaces and line, and executes various functions of the terminal and data processing by running or executing the software program and/or the module stored in the memory 130 that may be a non-transitory computer readable medium, and by invoking data stored in the memory 130, so as to perform overall monitoring on the mobile phone. Optionally, the processor 180 may include one or more processing units. Preferably, an application processor and a modem processor may be integrated in the processor 180. The application processor mainly processes an operating system, a user interface, an application program, and the like. The modem processor is mainly configured to deal with wireless communications. It can be understood that the modem processor may alternatively not be integrated into the processor 180.

The terminal further includes the power supply 190 (for example, a battery) supplying power to each component. Preferably, the power supply may be logically connected to the processor 180 by using a power management system, so that functions such as charging and discharging management and power consumption management are implemented by using the power management system.

Although not shown, the terminal may further include a camera, a Bluetooth module, or the like, and details are not described herein.

In the embodiments of this application, the display screen may be a non-self-luminous display screen, such as an edge-backlit LCD display screen, a direct-backlit LCD display screen, an E-ink screen, or the like. A backlight source providing backlight for the display screen may be a point light source, a line light source, or an area light source. The display screen may be divided into multiple regions, and different light sources may provide backlight for different regions.

Generally, the light source may be an LED light bar. Each light source may be used for providing backlight for one region of the display screen or providing backlight for multiple regions of the display screen. Only one light source may provide backlight for each region of the display screen, or multiple light sources may provide backlight for each region of the display screen at the same time.

Figure 2:
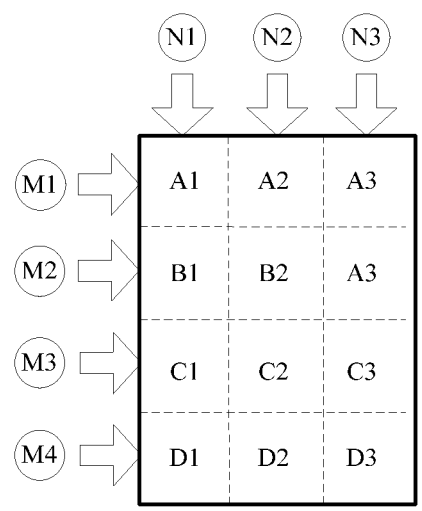
FIG. 2 is a schematic diagram of a location relationship between a light source and a display screen according to the present invention.

The edge-backlit LCD is used as an example. The LED light bar providing backlight for an LCD optical module may be disposed on at least one side of the display screen. As shown in FIG. 2, the LED light bar may be disposed on two sides of the display screen. M1 to M4 and N1 to N3 represent different LED light bars, and A1 to D3 represent different regions of the display screen. M1 is used for providing backlight for A1, A2, and A3. M2 is used for providing backlight for B1, B2, and B3. M3 is used for providing backlight for C1, C2, and C3. M3 is used for providing backlight for D1, D2, and D3. N1 is used for providing backlight for A1, B1, C1, and D1. N2 is used for providing backlight for A2, B2, C2, and D2. N3 is used for providing backlight for A3, B3, C3, and D3. M1 to M3 each provide backlight for three regions, and N1 to N3 each provide backlight for four regions. Correspondingly, two light sources provide backlight for each of A1 to D3. Each region may include at least one pixel.

To protect a display screen, a terminal user generally equips a terminal with various protective screen cases such as a leather case. The leather case may cover the display screen so as to protect the display screen and avoid a scratch or a shatter on the display screen. The display screen is covered by the leather case. Therefore, to avoid a case in which the user can view content such as time and incoming call information each time only when opening the leather case, a window is generally disposed, on the existing leather case, at a location at which the content such as time and incoming call information displayed on the display screen is covered. In this way, the user can directly view, through the window, information displayed on the display screen, without opening the leather case. A region that is of the display screen and that is corresponding to the window may be referred to as a leather case window region. When the display screen is in a screen-locked state, a manner of displaying a specific image in the leather case window region may be referred to as a leather case mode.

In the leather case mode, the user can view only an image displayed in the leather case window region, and an image displayed in another region cannot be viewed by the user. Therefore, in the leather case mode, lighting all light sources of the display screen at the same time has no effect on viewing, by the user, an image displayed on the display screen. Instead, this leads to unnecessary power consumption. Therefore, in the leather case mode, the terminal may light only a light source providing backlight for the leather case window region, so that power consumption can be reduced.

Figure 3:
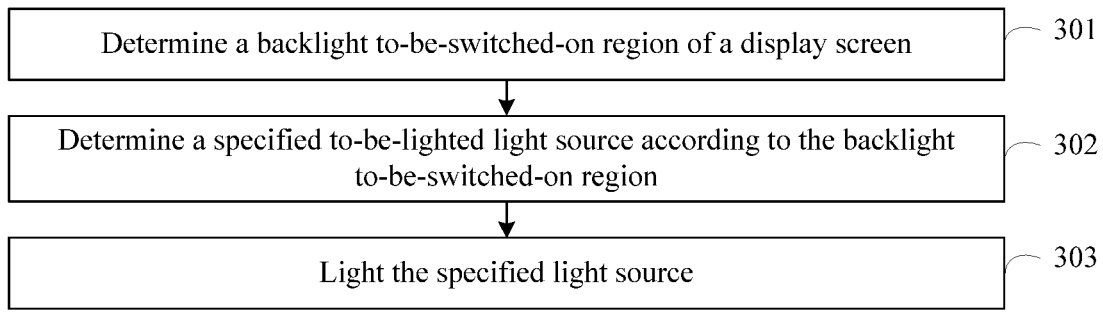
FIG. 3 is a flowchart of an embodiment of a display screen backlight control method according to the present invention.

Referring to FIG. 3, FIG. 3 is a schematic flowchart of an embodiment of a display screen backlight control method according to this application. This embodiment may be implemented by a terminal to control backlight of a display screen of the terminal. The following further describes this application with reference to FIG. 3.

Step 301: Determine a backlight to-be-switched-on region of the display screen.

The backlight to-be-switched-on region is a region that is of the display screen and in which backlight needs to be switched on. Generally, the backlight to-be-switched-on region is a region that is of the display screen and that is not shielded by a leather case or a like object and can be viewed by the user. For example, when the display screen is covered by a leather case, the backlight to-be-switched-on region may be a leather case window region in a leather case mode.

The terminal may determine the backlight to-be-switched-on region in different manners according to actual different use statuses.

Figure 4:
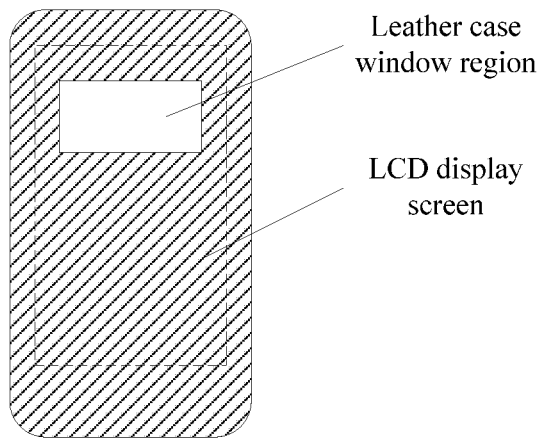
FIG. 4 is a schematic diagram of a leather case window region according to the present invention.

Optionally, the terminal may directly use a preset region of the display screen as the backlight to-be-switched-on region. The leather case matches the terminal, and a window of a same type of leather case is at a location on the leather case. Therefore, the terminal may directly use a specific region of the display screen as a leather case window region. For example, as shown in FIG. 4, FIG. 4 is a schematic diagram of an effect brought when the leather case covers a front face of the terminal. A dashed-line box represents a location of the display screen, a slash part represents a region covered by the leather case, and a blank part represents a region that is of the display screen and that is not covered by the leather case, that is, the leather case window region. When detecting the region that is of the display screen and that is covered by the leather case, the terminal may directly use the leather case window region as the backlight to-be-switched-on region.

Optionally, the terminal may determine the backlight to-be-switched-on region according to a user interface image that needs to be displayed on the display screen. The terminal may use a region that is of the display screen and that is used to display a specified user interface element, as the backlight to-be-switched-on region. The specified user interface element may be a part of user interface elements included in the user interface image, for example, a widget (widget) on a user interface.

For example, when the display screen is configured to display a lock screen user interface, the terminal may use a region that is of the display screen and that is used to display a weather widget, as the backlight to-be-switched-on region.

Optionally, the terminal may determine the backlight to-be-switched-on region according to a contact status between the display screen and an object. The object may be an object other than the terminal, and generally may be a leather case.

When different leather cases are used, locations and sizes of leather case window regions may be different. When the display screen is a touchscreen (touch screen), the terminal may alternatively determine the backlight to-be-switched-on region according to a contact status between the display screen and an object. The terminal may determine, according to a pressure detected by a force touch unit of the display screen, a region in which the display screen is in contact with the leather case, or determine, according to a capacitance of a capacitance touch unit of the display screen, a region in which the display screen is in contact with the leather case, and then use a region in which the display screen is not in contact with the leather case, as the backlight to-be-switched-on region.

To ensure that the terminal can detect whether the leather case is in contact with the display screen, the leather case may be a leather case that can cause a change in an electric field of the capacitance touch unit after the leather case is in contact with the display screen, or may be a leather case that can generate a pressure on the display screen after the leather case is in contact with the display screen.

For example, when the display screen is a capacitive touchscreen, a side that is of the leather case and that is in contact with the capacitive touchscreen may be a conductor. When the leather case is in contact with the display screen, a capacitance touch unit of the capacitive touchscreen can generate a coupling capacitance, so that the terminal may determine, according to the coupling capacitance, a location at which the display screen is in contact with the object and a contact area between the display screen and the object.

For another example, when the display screen is a pressure-sensitive touchscreen, there is a protrusion structure on a side that is of the leather case and that is in contact with the display screen. When edges of the leather case are attached to edges of the front face of the mobile phone, the protrusion structure may generate a pressure on the pressure-sensitive touchscreen. A pressure sensor of the pressure-sensitive touchscreen can detect the pressure, so that the terminal can determine, according to the pressure, a location at which the display screen is in contact with the object and a contact area between the display screen and the object.

When performing a touch operation, the user is also in contact with the display screen. Therefore, to avoid incorrect determining, the terminal may determine, according to an area of a contact region, whether contact between the display screen and the object is caused due to cover by the leather case or caused by a user operation.

Because a contact region in which the leather case is in contact with the display screen is far larger than a contact region in which a finger or a stylus is in contact with the display screen when the user performs a touch operation, the terminal may determine, according to a size of an area of the contact region, whether the display screen is in contact with the leather case or the object. Specifically, the terminal may first determine the contact region in which the display screen is in contact with the object, and determine the area of the contact region, and when a ratio of the area of the contact region to an area of the display screen is greater than or equal to a threshold, use a region of the display screen except the contact region as the backlight to-be-switched-on region. There may be one or more contact regions. When there are multiple discontinuous contact regions, one continuous region may be determined according to the multiple contact regions and a preset rule, and then a region except the continuous region is used as the backlight to-be-switched-on region.

When contact between the display screen and the object is caused by a user operation, as the user operation changes, the size and the location of the contact region also change. When the display screen is in contact with the leather case, the size and the location of the contact region keep unchanged within a period of time. Therefore, the terminal may also detect whether the contact region changes to determine whether the display screen is in contact with the leather case or with the object. Specifically, the terminal may first determine, according to a pressure applied on the display screen, a contact region in which the display screen is in contact with the object, and detect whether the contact region changes within first duration. If the contact region does not change within the first duration, the terminal may use a region of the display screen except the contact region as the backlight to-be-switched-on region. A change of the contact region may include a change of a location and an area of the contact region and a value change of a pressure applied in the contact region.

It should be noted herein that the backlight to-be-switched-on region may be all or some regions of the display screen. When the backlight to-be-switched-on region includes some regions of the display screen, there may be one or more backlight to-be-switched-on regions.

Step 302: Determine a specified to-be-lighted light source of all light sources of the display screen according to the backlight to-be-switched-on region.

Because backlight of the display screen is generally provided by multiple light sources, each light source provides backlight for some regions of the display screen, and different light sources provide backlight for different regions. In addition, a light source providing backlight for each region is fixed, and each light source provides backlight only for a fixed region. Therefore, after the backlight to-be-switched-on region is determined, it may be easily determined which light sources provide backlight for the backlight to-be-switched-on region, and further a light source providing backlight for the backlight to-be-switched-on region may be used as the specified light source.

As shown in FIG. 2, when the backlight to-be-switched-on region is in the A2 region range, M1 and N2 providing backlight for the A2 region are specified light sources. When the backlight to-be-switched-on region overlaps with both A1 and A2, M1, N1, and N2 are specified light sources.

Step 303: Light the specified light source.

After the specified light source is determined, the terminal may light, by means of control by a driver, a controller, or the like, only the specified light source of all the light sources of the display screen instead of lighting a light source other than the specified light source, so as to reduce a quantity of lighted light sources.

For example, when M1 and N2 are specified light sources, the terminal may determine that only M1 and N2 need to be lighted while no other light sources need to be lighted. In this case, by using a determined program or the controller, the terminal may stop providing a power-supply voltage for a light source other than M1 and N2, so that only M1 and N2 of all the light sources are lighted.

According to the implementation of this application, when displaying an image, the terminal may light only some light sources, so as to reduce light source power consumption and power consumption of the display screen.

Because a light source of the display screen is generally a point light source, backlight of the display screen is generally generated after light emitted from the point light source is diffused by a light guide plate. Therefore, if only the specified light source is lighted, although backlight can be provided for the backlight to-be-switched-on region, backlight intensity of different sub-regions of the backlight to-be-switched-on region may be different because some light sources are not switched on. As a result, an image displayed in the backlight switched-on region has non-uniform luminance.

When the specified light source is located on a left side of the backlight to-be-switched-on region, if only the specified light source is switched on, backlight intensity on the left side of the backlight to-be-switched-on region may be weaker than that on a right side of the backlight switched-on region. As a result, an image displayed in the backlight switched-on region has non-uniform luminance. Consequently, the image displayed in the backlight region has a non-uniform color.

To ensure that the image displayed in the backlight switched-on region has uniform luminance, optionally, the method may further include the following step.

Step 304: Correct, according to the specified light source, chrominance of the image displayed in the backlight switched-on region.

Generally, luminance of backlight in the backlight switched-on region changes in a stepwise manner, that is, the backlight in the backlight switched-on region gradually becomes darker from a side far from the light source to a side close to the light source. Because the luminance of backlight in the backlight switched-on region changes in a stepwise manner, and an image color is determined by both chrominance and luminance, chrominance (chromaticity) of the image displayed in the backlight switched-on region may be adjusted to cancel impact caused by a luminance value difference in the backlight switched-on region on the color of the image displayed in the backlight switched-on region.

The terminal may first obtain a benchmark luminance value, and then adjust, according to the benchmark luminance value, chrominance of an image displayed in each sub-region of the backlight switched-on region. Each sub-region may include at least one pixel. The benchmark luminance value may be a preset value, an average luminance value of the backlight switched-on region, or a luminance value of a sub-region of the backlight switched-on region.

When a luminance value of backlight in a sub-region is greater than the benchmark luminance value, chrominance of an image displayed in the sub-region may be decreased correspondingly. When a luminance value of backlight in a sub-region is less than the benchmark luminance value, chrominance of an image displayed in the sub-region may be increased correspondingly. A magnitude of increasing or decreasing the chrominance may be equal to a difference magnitude between the luminance value of the sub-region and the benchmark luminance value.

For example, the terminal may first determine an average luminance value of the backlight switched-on region. When a luminance value of a sub-region in the backlight switched-on region is greater than the average luminance value, chrominance of an image displayed in the sub-region may be decreased, where a magnitude of decreasing the chrominance is equal to a magnitude by which the luminance value exceeds the average luminance value. When the luminance value of the sub-region is less than the average luminance value, chrominance of an image displayed in the sub-region may be increased, where a magnitude of decreasing the chrominance is equal to a magnitude by which the luminance value exceeds the average luminance value.

It should be noted herein that each sub-region includes several pixels. Therefore, luminance of backlight in each sub-region may be determined according to luminance of pixels in the sub-region by means of calculation. Because a relative location of a light source of the display screen and a relative location of each pixel are fixed, a luminance value of each pixel may be measured in advance or determined by means of calculation when different light sources are lighted.

In this embodiment, the backlight to-be-switched-on region of the display screen is determined, where the backlight to-be-switched-on region is a region that is of the display screen and that needs to be displayed to a user and the backlight to-be-switched-on region is a region that is of the display screen and in which backlight needs to be switched on, a specified to-be-lighted light source is determined according to the backlight to-be-switched-on region, and the specified light source is lighted. According to this embodiment, when displaying an image, the terminal may light only some light sources, so as to reduce light source power consumption and power consumption of the display screen.

Figure 5:
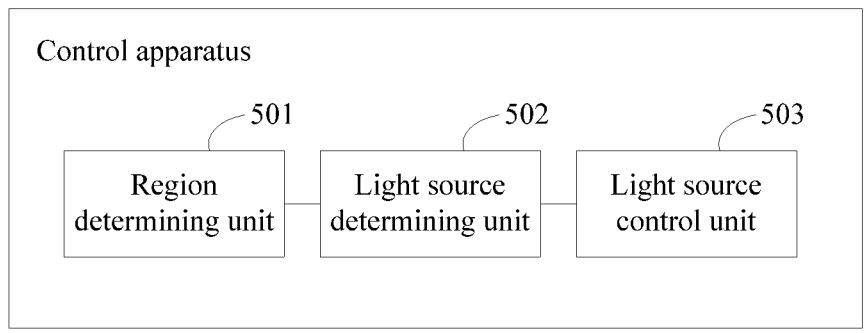
FIG. 5 is a schematic structural diagram of an embodiment of a display screen backlight providing apparatus according to the present invention.

Referring to FIG. 5, FIG. 5 is a schematic structural diagram of an embodiment of a display screen backlight control apparatus according to this application.

As shown in FIG. 5, the apparatus includes a region determining unit 501, a light source determining unit 502, and a light source control unit 503.

The region determining unit 501 is configured to determine a backlight to-be-switched-on region of the display screen, where the backlight to-be-switched-on region is a region that is of the display screen and that needs to be displayed to the user. The light source determining unit 502 is configured to determine a specified to-be-lighted light source according to the backlight to-be-switched-on region. The light source control unit 503 is configured to light the specified light source.

Optionally, the region determining unit 501 is specifically configured to determine the backlight to-be-switched-on region according to a contact status between the display screen and an object.

Optionally, the region determining unit 501 includes a first contact region determining subunit, configured to determine a contact region in which the display screen is in contact with the object, and a first backlight to-be-switched-on region determining subunit, configured to when a ratio of an area of the contact region to an area of the display screen is greater than or equal to a threshold, use a region of the display screen except the contact region as the backlight to-be-switched-on region.

Optionally, the region determining unit 501 includes a second contact region determining subunit, configured to determine a contact region in which the display screen is in contact with the object; and a second backlight to-be-switched-on region determining subunit, configured to when the contact region does not change within first duration, use a region of the display screen except the contact region as the backlight to-be-switched-on region.

Optionally, the region determining unit 501 is specifically configured to determine the backlight to-be-switched-on region according to a user interface image.

Optionally, the region determining unit 501 is specifically configured to, when the display screen is configured to display a specified user interface, use a region of a specified user interface element on the specified user interface displayed on the display screen, as the backlight to-be-switched-on region.

Optionally, the light source determining unit 502 includes a partition determining subunit, configured to determine a light source corresponding to each partition of the display screen, where a set of light sources provides backlight for each partition, and a specified-light-source determining subunit, configured to use a light source that provides backlight for the partition overlapping with the backlight to-be-switched-on region, as the specified light source.

Optionally, the apparatus further includes a chrominance correction unit, configured to correct, according to the specified light source, chrominance of an image displayed in the backlight switched-on region.

Optionally, the correction unit includes a reference luminance obtaining subunit, configured to obtain a benchmark luminance value, and a chrominance adjustment subunit, configured to adjust, according to the benchmark luminance value, chrominance of an image displayed in each sub-region of the backlight switched-on region.

Optionally, the chrominance adjustment subunit is specifically configured to, when a luminance value of backlight in the sub-region is greater than the benchmark luminance value, decrease chrominance of an image displayed in the sub-region, or when a luminance value of backlight in the sub-region is less than the benchmark luminance value, increase chrominance of an image displayed in the sub-region.

In this embodiment of this application, the processor is configured to determine a backlight to-be-switched-on region of the display screen, determine a specified to-be-lighted light source according to the backlight to-be-switched-on region, and light the specified light source.

Optionally, when determining the specified light source, the processor 180 may be configured to determine the backlight to-be-switched-on region according to a contact status between the LCD display screen 141 and an object. The processor 180 may first determine a contact region in which the LCD display screen 141 is contact with the object, and when a ratio of an area of the contact region to an area of the LCD display screen 141 is greater than or equal to a threshold, use a region of the LCD display screen 141 except the contact region as the backlight to-be-switched-on region, or when the contact region does not change within first duration, use a region of the LCD display screen 141 except the contact region as the backlight to-be-switched-on region.

Optionally, when determining the specified light source, the processor 180 may be configured to determine the backlight to-be-switched-on region according to a user interface image. When the LCD display screen 141 is configured to display a specified user interface, the processor 180 may use a region of a specified user interface element on the specified user interface displayed by the LCD display screen 141, as the backlight to-be-switched-on region.

Optionally, when determining the specified light source, the processor 180 may determine a light source corresponding to each partition of the LCD display screen 141, where a set of light sources provides backlight for each partition, and use a light source that provides backlight for the partition overlapping with the backlight to-be-switched-on region, as the specified light source.

Optionally, the processor 180 may be further configured to correct, according to the specified light source, chrominance of an image displayed in the backlight switched-on region. The processor 180 may first obtain a benchmark luminance value, and then adjust, according to the benchmark luminance value, chrominance of an image displayed in each sub-region of the backlight switched-on region. Specifically, when a luminance value of backlight in the sub-region is greater than the benchmark luminance value, the processor 180 may decrease the chrominance of the image displayed in the sub-region. When the luminance value of backlight in the sub-region is less than the benchmark luminance value, the processor 180 may increase the chrominance of the image displayed in the sub-region.

In specific implementation, this application further provides a computer storage medium, where the computer storage medium may store a program, and when the program is executed, some or all steps in each embodiment of the display screen backlight control method provided in this application may be included. The foregoing storage medium may include a magnetic disk, an optical disc, a read-only memory (Read-Only Memory, ROM for short), a random access memory (Random Access Memory, RAM for short), or the like.

A person skilled in the art may clearly understand that, the technologies in the embodiments of this application may be implemented by software in addition to a necessary general hardware platform. Based on such an understanding, the technical solutions of the present application essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present application.

The embodiments in this specification are all described in a progressive manner, for same or similar parts in the embodiments, reference may be made to these embodiments. The foregoing descriptions are implementations of the present application, but are not intended to limit the protection scope of the present application.

What is claimed is:

1. A liquid crystal display screen backlight control method, the method comprising:
   determining a contact region in which the display screen is in contact with an object;
   determining a backlight to-be-switched-on region of a display screen according to an operation on the display screen, wherein the determining the backlight to-be-switched-on region according to the operation on the display screen comprises selecting a region of the display screen as the backlight to-be-switched-on region in response to at least one of the contact region not changing within a first time duration or a ratio of an area of the contact region to an area of the display screen being greater than or equal to a threshold;
   determining a specified to-be-lighted light source according to the backlight to-be-switched-on region; and
   lighting the specified to-be-lighted light source and illuminating at least the backlight to-be-switched on region of the display screen while maintaining other light sources associated with a region outside of the backlight to-be-switched-on region in an unilluminated state.

2. The method according to claim 1,
   wherein the backlight to-be-switched-on region is at least a portion of a region outside of an area of contact between the display screen and the object.

3. The method according to claim 2, wherein the determining the backlight to-be-switched-on region comprises:
   using a region of the display screen other than the contact region as the backlight to-be-switched-on region in response to the ratio of the area of the contact region to the area of the display screen being greater than or equal to the threshold.

4. The method according to claim 2, wherein the determining the backlight to-be-switched-on region comprises:
   using a region of the display screen other than the contact region as the backlight to-be-switched-on region in response to the contact region not changing within the first time duration.

5. The method according to claim 1,
   wherein the determining the backlight to-be-switched-on region further comprises:
   determining the backlight to-be-switched-on region according to a user interface image.

6. The method according to claim 5, wherein the determining the backlight to-be-switched-on region according to the user interface image comprises:
   using a region of a specified user interface element on a specified user interface displayed on the display screen as the backlight to-be-switched-on region when the display screen displays the specified user interface.

7. The method according to claim 1, wherein the method further comprises:
   correcting, according to the specified light source, chrominance of an image displayed in the backlight to-be-switched-on region.

8. The method according to claim 7, wherein the correcting the chrominance of the image displayed in the backlight to-be-switched-on region comprises:
   obtaining a benchmark luminance value; and
   adjusting, according to the benchmark luminance value, chrominance of an image displayed in each sub-region of the backlight switched-on region.

9. A terminal, comprising:
   a display screen;
   a processor connected to the display screen and configured to control the display and backlighting of the display screen; and
   a non-transitory computer-readable storage medium storing a program to be executed by the processor, the program including instructions to:
   determine a contact region in which the display screen is in contact with an object;
   determine a backlight to-be-switched-on region of the display screen according to an operation on the display screen, wherein the instructions to determine the backlight to-be-switched-on region according to the operation on the display screen include instructions to select a region of the display screen as the backlight to-be-switched-on region in response to at least one of the contact region not changing within a first time duration or a ratio of an area of the contact region to an area of the display screen being greater than or equal to a threshold;
   determine a specified to-be-lighted light source according to the backlight to-be-switched-on region; and
   light the specified to-be-lighted light source and illuminate at least the backlight to-be-switched on region of the display screen while maintaining other light sources associated with a region outside of the backlight to-be-switched-on region in an unilluminated state.

10. The terminal according to claim 9,
    wherein the backlight to-be-switched-on region is at least a portion of a region outside of an area of contact between the display screen and the object.

11. The terminal according to claim 10, wherein the instructions to determine the backlight to-be-switched-on region include instructions to:
    use a region of the display screen except the contact region as the backlight to-be-switched-on region in response to the ratio of the area of the contact region to the area of the display screen being greater than or equal to the threshold.

12. The terminal according to claim 10, wherein the instructions to determine the backlight to-be-switched-on region include instructions to:
    use a region of the display screen except the contact region as the backlight to-be-switched-on region in response to the contact region not changing within the first time duration.

13. The terminal according to claim 9,
wherein the instructions to determine the backlight to-be-switched-on region include instructions to determine the backlight to-be-switched-on region according to a user interface image.

14. The terminal according to claim 13, wherein the instructions to determine the backlight to-be-switched-on region include instructions to use a region of a specified user interface element on a specified user interface displayed on the display screen as the backlight to-be-switched-on region when the display screen displays the specified user interface.

15. The terminal according to claim 9, wherein the program further includes instructions to:
correct, according to the specified light source, chrominance of an image displayed in the backlight to-be-switched-on region.

16. The terminal according to claim 15, wherein the instructions to correct the chrominance of the image displayed in the backlight switched-on region include instructions to:
obtain a benchmark luminance value; and adjust, according to the benchmark luminance value, chrominance of an image displayed in each sub-region of the backlight to-be-switched-on region.

17. A non-transitory computer readable storage medium storing one or more programs, the one or more programs comprising instructions, which when executed by an apparatus with a display screen, cause the apparatus to:
determine a contact region in which the display screen is in contact with an object;
determine a backlight to-be-switched-on region of the display screen according to an operation on the display screen, wherein the instructions to determine the backlight to-be-switched-on region according to the operation on the display screen include instructions to select a region of the display screen as the backlight to-be-switched-on region in response to at least one of the contact region not changing within a first time duration or a ratio of an area of the contact region to an area of the display screen being greater than or equal to a threshold;
determine a specified to-be-lighted light source according to the backlight to-be-switched-on region; and
light the specified to-be-lighted light source and illuminate at least the backlight to-be-switched on region of the display screen while maintaining other light sources associated with a region outside of the backlight to-be-switched-on region in an unilluminated state.

18. The computer readable storage medium of claim 17, wherein the backlight to-be-switched-on region is at least a portion of a region outside of an area of contact between the display screen and the object.

19. The computer readable storage medium of claim 17, wherein the instructions which cause the apparatus to determine the backlight to-be-switched-on region of the display screen include instructions which cause the apparatus to:
use the region of the display screen except the contact region as the backlight to-be-switched-on region in response to the ratio of an area of the contact region to the area of the display screen being greater than or equal to the threshold.

20. The computer readable storage medium of claim 17, wherein the instructions which cause the apparatus to determine the backlight to-be-switched-on region of the display screen include instructions which cause the apparatus to:
use a region of the display screen except the contact region as the backlight to-be-switched-on region in response to the contact region not changing within the first time duration.

* * * * *